United States Patent
Yasui et al.

(10) Patent No.: US 7,260,463 B2
(45) Date of Patent: Aug. 21, 2007

(54) PLANT CONTROL SYSTEM

(75) Inventors: Yuji Yasui, Wako (JP); Kanako Shimojo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 10/852,264

(22) Filed: May 25, 2004

(65) Prior Publication Data

US 2005/0015193 A1 Jan. 20, 2005

(30) Foreign Application Priority Data

Jun. 2, 2003 (JP) .............................. 2003-156779

(51) Int. Cl.
*G06F 7/00* (2006.01)
(52) U.S. Cl. .......................... 701/67; 701/25; 701/112; 701/208; 60/284
(58) Field of Classification Search ................ 701/110, 701/111, 112, 113, 67, 25, 208; 123/339.2, 123/352; 700/55; 60/284, 285
See application file for complete search history.

(56) References Cited

U.S. PATENT DOCUMENTS

| | | | |
|---|---|---|---|
| 4,822,037 A | | 4/1989 | Makansi et al. |
| 6,094,602 A | * | 7/2000 | Schade, III ................... 700/45 |
| 6,256,983 B1 | * | 7/2001 | Yasui ........................... 60/285 |
| 6,950,711 B2 | * | 9/2005 | Havener et al. ............... 700/28 |
| 6,950,741 B2 | * | 9/2005 | Ishikawa et al. ............ 701/110 |

2002/0134958 A1 9/2002 Smith et al.

FOREIGN PATENT DOCUMENTS

JP 2002-318605 10/2002

OTHER PUBLICATIONS

Makoto Iwasaki, et al., "Robust Speed Control of IM With Torque Feedforward Control", IEEE Transactions On Industrial Electronics, IEEE Service Center, Piscataway, NJ, vol. 40, No. 6, Dec. 1, 1993, pp. 553-560, XP000423243, ISSN: 0278-0046.
Atsuo Kawamura et al, "Chattering Reduction of Disturbance Observer Based Sliding Mode Control", IEEE Transactions On Industry Applications, IEEE Service Center, Piscataway, NJ, vol. 30, No. 2, Mar. 1, 1994, pp. 456-461, XP000457085 ISSN: 0093-9994.

* cited by examiner

*Primary Examiner*—Gertrude A. Jeanglaude
(74) *Attorney, Agent, or Firm*—Arent Fox LLP

(57) ABSTRACT

A plant control system provides an enhanced capability of compensation for disturbance that abruptly changes. A controller includes a disturbance predictor for calculating a predicted value of disturbance on the basis of a drag force of a release spring and an assisting force of a compensation spring that are predicted on the basis of a clutch stroke, an adaptive disturbance observer for calculating an estimated value of disturbance on the basis of the estimated value of disturbance, a voltage to be applied to a motor, and the clutch stroke, and a sliding mode controller, which determines the voltage to be applied to the motor by carrying out control for making the clutch stroke follow a clutch stroke target value by determining the voltage to be applied to the motor by sliding mode control on the basis of the clutch stroke, the predicted value of disturbance, and the estimated value of disturbance.

6 Claims, 11 Drawing Sheets

PLANT CONTROL SYSTEM

BACKGROUND OF THE INVENTION

1. Field of the Invention

The present invention relates to a control system for controlling outputs of a plant to be controlled using response specifying control.

2. Description of the Related Art

As a system for controlling outputs of a plant to be controlled using response specifying control, a throttle valve controller, for example, has been proposed. In this controller, the degree of opening of a throttle valve provided in an intake passage of an engine is adjusted by sliding mode control (refer to, for example, Japanese Laid-Open Patent Publication No. 2002-318605).

According to the aforesaid throttle valve controller, model parameters in a model equation of a driving device of the throttle valve are corrected on the basis of identification errors (deviations from reference values of model parameters). This makes it possible to reduce influences of modeling errors or disturbance in determining a manipulated variable of the driving device of the throttle valve.

However, correcting model parameters on the basis of identification errors, as described above, has been making it impossible to accomplish adequate compensation for disturbance that abruptly changes, although satisfactory compensation has been accomplished for disturbance that slowly changes.

SUMMARY OF THE INVENTION

The present invention has been made to provide a plant control system that solves the aforesaid problem and features enhanced performance of compensating for disturbance that abruptly changes. The present invention relates to an improvement in a plant control system equipped with a controlling device for determining a control input to a plant such that an output value of the plant coincides with a target output value under response specifying control that makes it possible to variably designate a convergent behavior for a difference between a plant output value and a target output value.

The plant control system has a disturbance predictor for determining a predicted value of disturbance for prediction of a level of disturbance acting on the plant on the basis of an output value of the plant, wherein the controlling device determines a control input to the plant on the basis of a linear function and the predicted value of disturbance that define a convergent behavior for the difference.

With this arrangement, a control input to the plant can be determined on the basis of a value of the linear function and the predicted value of disturbance, allowing the control input to be determined in the feedforward fashion by reflecting beforehand an influence of disturbance to be generated. Hence, even if disturbance abruptly takes place, the disturbance can be compensated for, making an output value of the plant follow the target output value on the basis of a convergent behavior designated by the linear function.

Furthermore, the plant control system includes a storage that stores in advance data of a correlation map representing a correlation between output values of the plant and levels of disturbance acting upon the plant, wherein the disturbance predictor takes a level of disturbance obtained by applying an actual output value of the plant to the correlation map as the predicted value of disturbance.

This arrangement allows the disturbance predictor to easily determine a predicted value of disturbance based on an output value of the plant according to the correlation map and to maintain good controllability on the basis of output values of the plant even if disturbance abruptly changes.

The controlling device determines a control input to the plant according to a model equation for calculating an output of the plant in a next control cycle by inputting an output of the plant in a control cycle before the present cycle and a control input to the plant and disturbance for each predetermined control cycle, using a value of a control input in the model equation obtained when the linear function is set to zero.

With this arrangement, data processing for implementing response specifying control used by the controlling device can be easily accomplished by using the model equation. No differential values of inputs/outputs of the plant are used, so that influences exerted on controllability by frequency noises attributable to disturbance can be minimized. This permits further accurate response designation of output values of the plant particularly by the response specifying control.

The plant control system further includes a disturbance estimator for determining an estimated value of disturbance that changes according to an error of the predicted value of disturbance relative to a level of actual disturbance acting upon the plant on the basis of the predicted value of disturbance, an output value of the plant, and a control input to the plant, wherein the controlling device determines a control input to the control plant by using the estimated value of disturbance.

With this arrangement, if a difference takes place between a level of disturbance based on the predicted value of disturbance determined by the disturbance predictor and a level of disturbance actually happens, then the difference can be compensated for on the basis of the estimated value of disturbance determined by the disturbance estimator, allowing an actual output value of the plant to follow the target output value according to a convergent behavior defined by the linear function.

The plant is a clutching mechanism for switching between transmission and cutoff of motive power from a driving shaft to a driven shaft. The plant has an actuator for actuating at least one of a clutch disc for the driving shaft and a clutch disc for the driven shaft that are in frictional engagement, and an elastic member generating a drag force or an assisting force applied to the actuator according to an operation of the actuator. The target output indicates a distance between the clutch disc of the driving shaft and the clutch disc of the driven shaft. The control input indicates a manipulated variable for the actuator, and the disturbance predictor determines, as the predicted value of disturbance, an output level of the elastic member that changes according to a distance between the clutch disc for the driving shaft and the clutch disc for the driven shaft.

With this arrangement, when an output of the elastic member changes with the distance between the clutch disc for the driving shaft and the clutch disc for the driven shaft, the output of the elastic member based on the distance can be determined as the predicted value of disturbance by the disturbance predicting means. Then, the controlling device determines a manipulated variable for the actuator on the basis of the predicted value of disturbance. Thus, a sudden change in an output of the elastic member can be compensated for, allowing the distance between the clutch disc for the driving shaft and the clutch disc for the driven shaft to successfully follow a target output value.

Furthermore, the plant is an engine, the target output is a speed of the engine, the control input is a manipulated variable for a throttle for adjusting an amount of fuel supplied to the engine, and the disturbance predictor determines, as the predicted value of disturbance, a degree of an opening of the throttle that changes according to the engine speed.

With this arrangement, when the degree of opening of the throttle changes to compensate for friction or the like that changes with the engine speed, the degree of the opening of the throttle based on the engine speed is determined as the predicted value of disturbance by the disturbance predictor. Then, the controlling device determines a manipulated variable for the throttle on the basis of the predicted value of disturbance. This makes it possible to compensate for a sudden change in the degree of opening of the throttle attributable to a change in a target speed of the engine, thus allowing the engine speed to successfully follow a target value.

Furthermore, the plant is an engine cam phase changing mechanism, the target output is a cam phase angle of the cam phase changing mechanism, the control input is a manipulated variable for an actuator operating the cam of the cam phase changing mechanism, and the disturbance predictor determines, as the predicted value of disturbance, a manipulated variable for the actuator that changes according to the cam phase angle.

With this arrangement, when an output of the actuator changes to compensate for friction that changes with the cam phase angle or a spring reaction force if a mechanism for returning the cam has a spring, the disturbance predictor determines, as the predicted value of disturbance, a manipulated variable for the actuator on the basis of the cam phase angle. Then, the controlling device determines a manipulated variable for the actuator on the basis of the predicted value of disturbance. This makes it possible to compensate for a sudden change in the manipulated variable of the actuator attributable to a change in the cam phase angle, thus allowing the cam phase angle to successfully follow a target value.

DESCRIPTION OF THE PREFERRED EMBODIMENTS

Figure 1A:
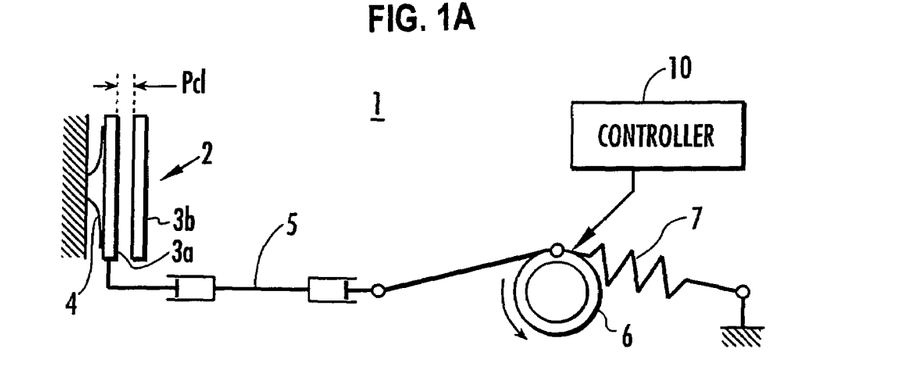
FIGS. 1A–1C includes a configuration diagram of a clutch mechanism and explanatory diagrams showing an elastic member in operation, the elastic member being provided in the clutch mechanism.
Figure 1B:
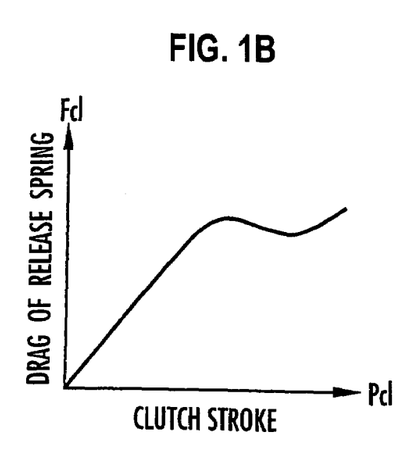
Figure 1C:
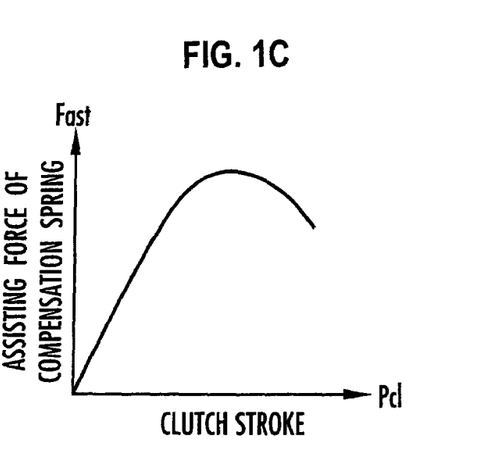
Figure 2:
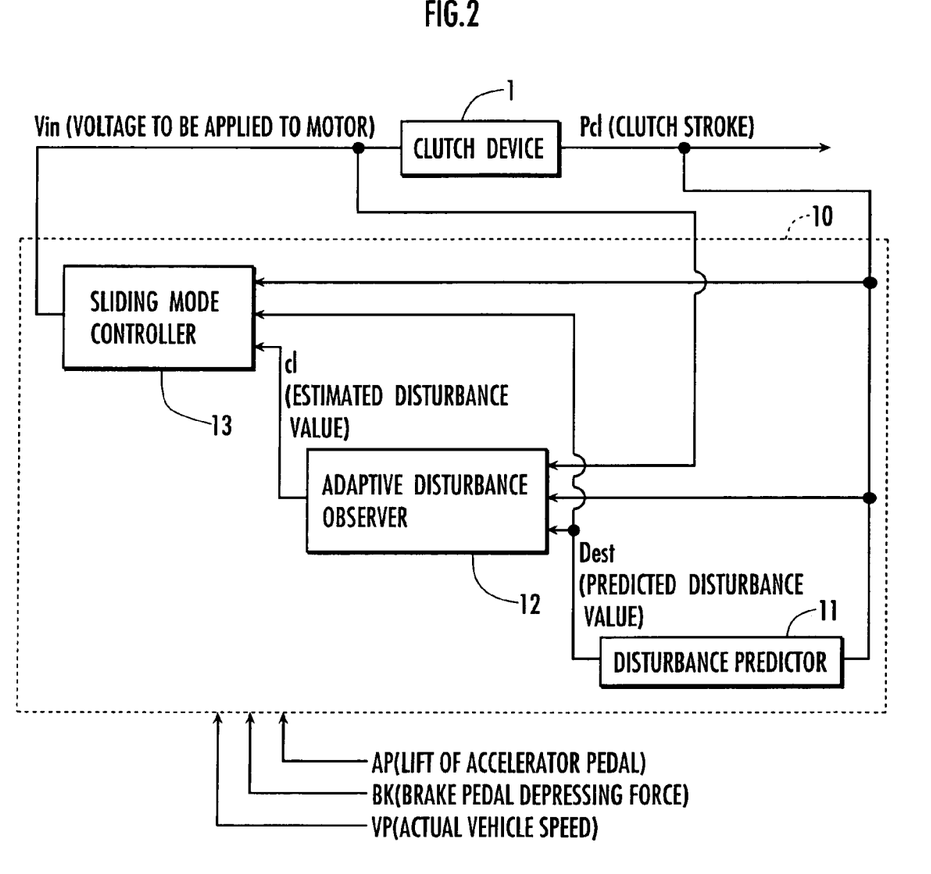
FIG. 2 is a block diagram showing control carried out by a controller of the clutch mechanism shown in FIG. 1A.
Figure 9:
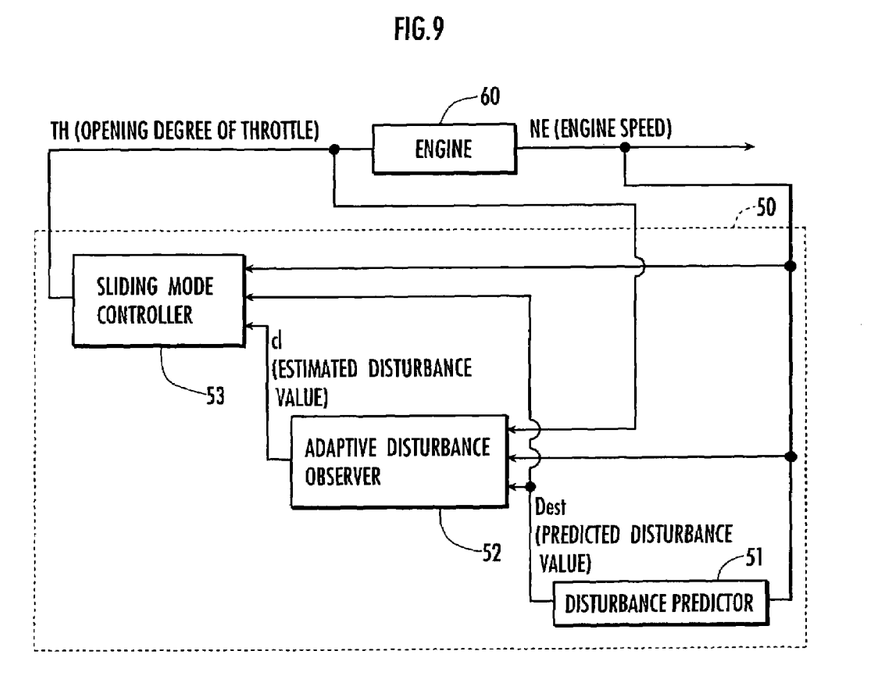
FIG. 9 is a block diagram of a construction in which the present invention has been applied to control of an engine speed.
Figure 10:
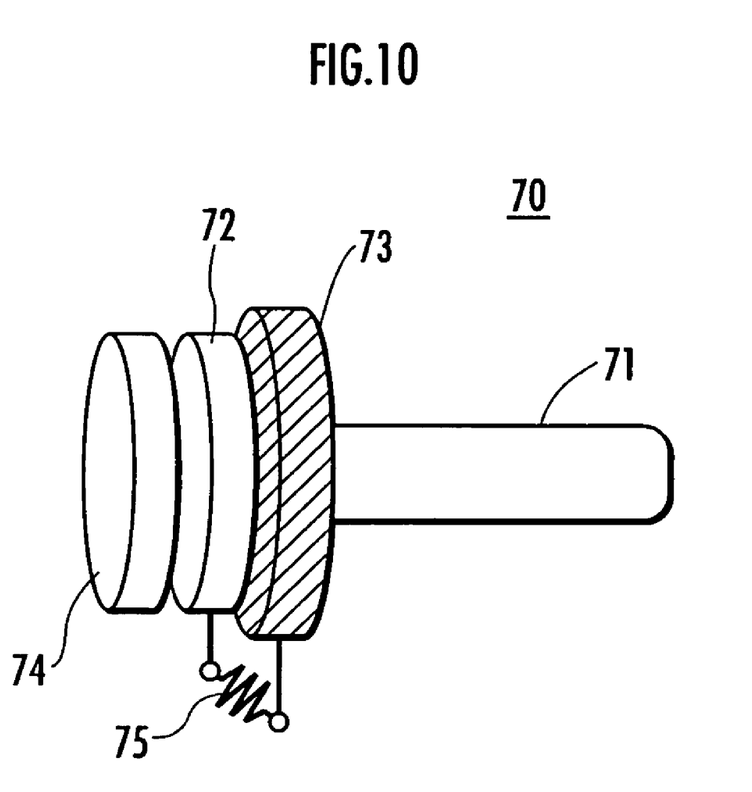
FIG. 10 is an explanatory diagram showing a construction of a cam phase changing device of an engine to which the present invention has been applied.
Figure 11:
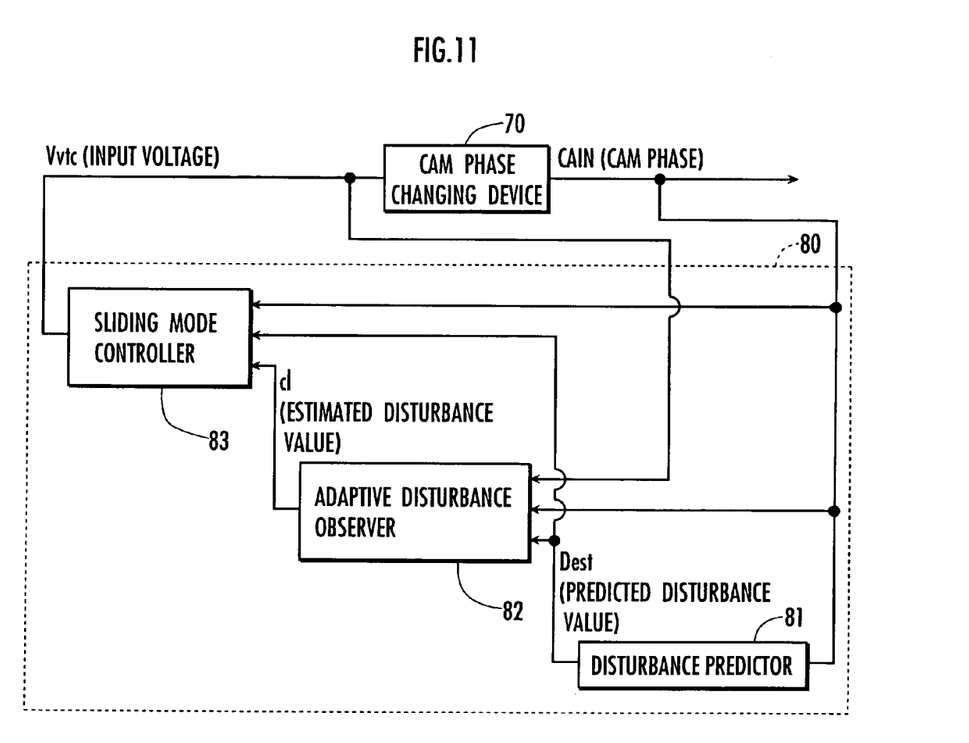
FIG. 11 is a block diagram showing the construction of the cam phase changing device of the engine to which the present invention has been applied.

Referring to FIG. 1A through FIG. 12, an embodiment of the present invention will be described. FIGS. 1A–1C include a configuration diagram of a clutch mechanism and an explanatory diagram showing an elastic member in operation, the elastic member being provided in the clutch mechanism. FIG. 2 is a block diagram showing control carried out by a controller of the clutch mechanism shown in FIGS. 1A–1C FIGS. 3A–3B show charts of simulation results obtained when the controller is provided with an adaptive disturbance observer. FIG. 4 through FIG. 8 are operation flowcharts of the controller shown in FIG. 2. FIG. 9 is an explanatory diagram of a system in which the present invention has been applied to control of an engine speed. FIG. 10 and FIG. 11 are explanatory diagrams showing a system in which the present invention has been applied to phase angle control of a cam phase changing device of an engine.

Referring to FIG. 1A, a clutch apparatus 1 corresponding to a plant in accordance with the present invention is provided in a vehicle to switch between transmission and cutoff of motive power from a driving shaft (not shown) driven by a drive source, such as an engine or an electric motor, to a driven shaft (not shown) provided in a transmission or the like by frictionally engaging/disengaging a clutch disc 3a and a clutch disc 3b of a clutch 2.

The clutch disc 3a has a release spring 4, which serves as an elastic member in the present invention. The urging force of the release spring 4 frictionally engages the clutch disc 3a and the clutch disc 3b (clutch ON). The clutch disc 3a is connected to a motor 6, which serves as the actuator in the present invention, through the intermediary of a hydraulic cylinder 5. Running the motor 6 in the direction of the arrow shown in the drawing causes the clutch disc 3a to leave the clutch disc 3b against the urging force of the release spring 4 (clutch OFF).

A compensation spring 7, which serves as an elastic member in the present invention and is attached to the motor 6, does not impart any force in a direction in which the motor 6 rotates when it is horizontally set, i.e., in the same direction in which the hydraulic cylinder travels. However, when the compensation spring 7 is inclined with respect to the horizontal direction, its tensile force adds to the force in a direction in which the motor 6 rotates, thus assisting the rotation of the motor 6. This reduces the output of the motor 6 required to set the clutch OFF state by running the motor 6, thus reducing the power consumption of the motor 6 and contributing to a reduced weight of the clutch apparatus 1 due to a decreased size of the motor 6.

FIG. 1B shows a chart indicating a relationship between a stroke Pcl of the clutch disc 3a (refer to FIG. 1A; hereinafter referred to as "clutch stroke") and a drag force Fcl of the release spring 4. The axis of abscissa indicates the clutch stroke Pcl, while the axis of ordinates indicates the drag force Fcl of the release spring 4. FIG. 1C shows a chart indicating a relationship between a stroke Pcl of the clutch disc 3a and an assisting force Fast of the compensation spring 7. The axis of abscissa indicates the clutch stroke Pcl, while the axis of ordinates indicates the assisting force Fast of the compensation spring 7.

As shown in FIGS. 1B and 1C, the relationship between the clutch stroke Pcl and the drag force Fcl of the release spring 4 and the assisting force Fast of the compensation spring 7 is nonlinear. Hence, there are cases where the drag force Fcl of the release spring 4 and the assisting force Fast of the compensation spring 7 abruptly change in response to changes in the clutch stroke Pcl.

Furthermore, the relationship between the clutch stroke Pcl and the drag force Fcl of the release spring 4 and the assisting force Fast of the compensation spring 7 may change due to secular changes or the like. For this reason, a controller 10 for controlling the operation of the clutching mechanism 1, which corresponds to a control apparatus of a plant in accordance with the present invention, is constructed to make the clutch stroke Pcl stably follow a target clutch stroke even if such changes take place. The construction and operation of the controller 10 will be described below.

Referring to FIG. 2, the controller 10 determines a voltage Vin to be applied to the motor 6 (the voltage corresponding to a control input in the present invention) on the basis of the clutch stroke Pcl corresponding to an actual output of the plant in the present invention.

The controller 10 includes a disturbance predictor 11, which corresponds to a disturbance predicting means in the present invention, for calculating a predicted value of disturbance Dest by using the drag force Fcl of the release spring 4 and the assisting force Fast of the compensation spring 7 as disturbance on the basis of the clutch stroke Pcl, an adaptive disturbance observer 12 corresponding to a disturbance estimating means in the present invention for calculating an estimated value of disturbance cl for compensating influences or the like of secular changes or variations in characteristics among individual parts of the release spring 4 and the compensation spring 7, and a sliding mode controller 13 that determines the voltage Vin to be applied to the motor by using sliding mode control, corresponding to the response specifying control in the present invention, on the basis of the predicted value of disturbance Dest calculated by the disturbance predictor 11, the estimated value of disturbance cl calculated by the adaptive disturbance observer 12, and the clutch stroke Pcl.

The controller 10 controls the operation of the motor 6 such that an actual clutch stroke Pcl coincides with a clutch stroke target value Pcl_cmd set by transmission control, which will be discussed hereinafter.

The controller 10 handles the clutch apparatus 1 according to a model equation of the following equation (1) obtained by modeling to determine the voltage Vin to be applied to the motor 6 for each predetermined control cycle using the sliding mode control based on the model equation, then outputs the determined voltage Vin.

[Equation 1]

$$Pcl(k+1) = a1 \cdot Pcl(k) + a2 \cdot Pcl(k-1) + b1 \cdot Vin(k) + cl'(k) \quad (1)$$

where Pcl(k): Clutch stroke in a k-th control cycle; Vin(k): Voltage to be applied to the motor in the k-th control cycle; a1, a2, b1: Model parameters; and cl'(k): Disturbance in the k-th control cycle.

The sliding mode controller 13 provided in the controller 10 determines the voltage Vin(k) to be applied to the motor according to an equation (6) derived by the following procedure.

First, as shown in the following equation (2), the difference between the actual clutch stroke Pcl(k) and the target value of clutch stroke Pcl_cmd(k) is denoted by Ecl(k), and a switching function σ(k) that regulates the convergent behavior of the difference in the sliding mode (corresponding to a linear function in the present invention) is represented by an equation (3) given below.

[Equation 2]

$$Ecl(k) = Pcl(k) - Pcl\_cmd(k) \quad (2)$$

where Ecl(k): Clutch stroke deviation in the k-th control cycle; Pcl(k): Actual clutch stroke in the k-th control cycle; and Pcl_cmd(k): Target value of clutch stroke in the k-th control cycle.

[Equation 3]

$$\sigma(k) = Ecl(k) - POLE \cdot Ecl(k-1) \quad (3)$$

where POLE: Switching function setting parameter (−1<POLE<0).

The switching function in the above equation (3) is represented by σ(k+1)=σ(k), and substituting this into the above equation (1) and the above equation (2) makes it possible to obtain an equivalent control input (Ueq(k)) of the following equation (4). In the calculation of the equivalent control input (Ueq(k)), terms related to clutch stroke target values (Pcl_cmd(k+1), Pcl_cmd(k), Pcl_cmd(k−1)) are all erased, because Pcl_cmd(k+1) providing a future value will be necessary.

[Equation 4]

$$Ueq(k) = \frac{1}{b1}\{(1 - a1 - POLE) \cdot Pcl(k) + (POLE - a2) \cdot Pcl(k-1) - cl'(k)\} \quad (4)$$

where Ueq(k): Equivalent control input in a k-th control cycle.

As a reaching law input Urch(k), a result of the calculation according to the following equation (5) can be used to provide the following equation (6) for calculating the voltage Vin to be applied to the motor.

[Equation 5]

$$Urch(k) = -\frac{Krch}{b1} \cdot \sigma(k) \quad (5)$$

where Urch(k): Reaching law input in a k-th control cycle; and Krch: Feedback gain.

[Equation 6]

$$Vin = Ueq(k) + Urch(k) \quad (6)$$

It could be possible to sequentially estimate and determine a disturbance term cl'(k) in the above equation (4) by an observer. As shown in FIG. 1A, however, the drag force of the release spring 4 and the assisting force of the compensation spring 7 act as disturbance when the motor 6 is run to control the clutch stroke Pcl.

As illustrated in FIG. 1B and FIG. 1C, the drag force Fcl of the release spring 4 and the assisting force Fast of the compensation spring 7 abruptly change nonlinearly in response to changes in the clutch stroke Pcl. For this reason, estimating the disturbance term cl'(k) by the observer results in an inadequate capability of compensating for abrupt changes in the drag force Fcl of the release spring 4 and the assisting force Fast of the compensation spring 7.

The controller 10, therefore, stores beforehand in a memory (not shown) data of a Pcl/Fclest map (corresponding to a correlation map in the present invention) indicating a correspondence relationship between the clutch stroke Pcl and the drag force Fcl of the release spring 4 shown in FIG. 1B in terms of clutch stroke Pcl and corresponding predicted values of the drag force Fclest of the release spring 4 associated with the clutch stroke Pcl.

The controller 10 also stores beforehand in a memory (not shown) data of a Pcl/Fastest map (corresponding to a correlation map in the present invention) indicating a correspondence relationship between the clutch stroke Pcl and the assisting force Fast of the compensation spring 7 shown in FIG. 1C in terms of clutch stroke Pcl and predicted value Fastest of the assisting force of the compensation spring 7 associated with the clutch stroke Pcl.

The disturbance predictor 11 provided in the controller 10 applies the clutch stroke Pcl to the Pcl/Fclest map so as to acquire a predicted value Fclest of the drag force of the release spring 4, and also applies the clutch stroke Pcl to the Pcl/Fastest map to acquire a predicted value Fastest of the assisting force of the compensation spring 7. Then, the disturbance predictor 11 calculates a predicted value of disturbance Dest according to the following equation (7).

[Equation 7]

$$Dest(k) = Fastest(k) - Fclest(k) \quad (7)$$

where Dest: Predicted value of disturbance in the k-th control cycle.

The predicted value of disturbance Dest(k) calculated according to the above equation (7) is taken as the disturbance term cl'(k) in the above equation (4). Thus, the drag force of the release spring 4 and the assisting force of the compensation spring 7 can be predicted in the feedforward fashion to determine the voltage Vin to be applied to the motor according to the above equation (6). This makes it possible to enhance the capability of compensating for abrupt changes in the drag force of the release spring 4 and the assisting force of the compensation spring 7.

The adaptive disturbance observer 12 provided in the controller 10 calculates estimated values of disturbance cl(k) according to the following equations (8) to (12).

[Equation 8]

$$\xi^T(k) = [Pcl(k-1) Pcl(k-2) Vin(k-1) 1\ Dest(k)] \quad (8)$$

where Dest(k): Predicted value of disturbance in a k-th control cycle.

[Equation 9]

$$\theta^T(k) = [a1\ a2\ b1\ cl(k)\ 1] \quad (9)$$

where cl(k): Estimated value of disturbance in a k-th control cycle.

[Equation 10]

$$Pcl\_hat(k) = \theta^T(k-1) \cdot \xi(k) \quad (10)$$

[Equation 11]

$$e\_dov(k) = Pcl(k) - Pcl\_hat(k) \quad (11)$$

[Equation 12]

$$cl(k) = cl(k-1) + \frac{Pdov}{1 + Pdov} \cdot e\_dov(k) \quad (12)$$

where Pdov: Identification gain.

The sliding mode controller 13 calculates an equivalent control input Ueq(k) according to the following equation (13) in which the disturbance term cl'(k) in the above equation (5) has been replaced by the predicted value of disturbance Dest(k) and the estimated value of disturbance cl(k), and then substitutes the equivalent control input Ueq(k) into the above equation (6) to calculate the voltage Vin(k) to be applied to the motor.

[Equation 13]

$$Ueq(k) = \frac{1}{b1}\{(1 - a1 - POLE) \cdot Pcl(k) + \quad (13)$$
$$(POLE - a2) \cdot Pcl(k-1) - cl(k) - Desk(k)\}$$

Thus, calculating the equivalent control input Ueq(k) by using the estimated value of disturbance Cl(k) in addition to the predicted value of disturbance Dest(k) allows the clutch stroke Pcl to successfully follow the target clutch stroke Pcl_cmd by suppressing influences attributable to deviation of an actually produced drag force of the release spring 4 or the assisting force of the compensation spring 7 from a level obtained from the aforesaid map search or attributable to disturbance taking place for other reasons.

Figure 3A:
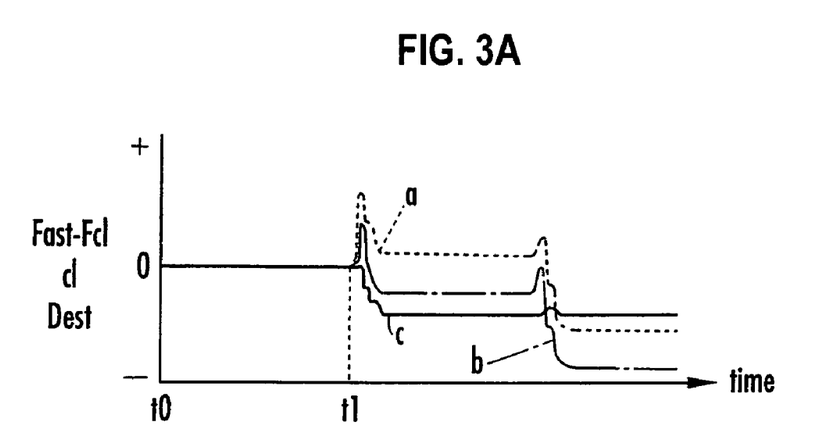
FIGS. 3A–3B are graphs showing simulation results obtained when the controller is provided with an adaptive disturbance observer.
Figure 3B:
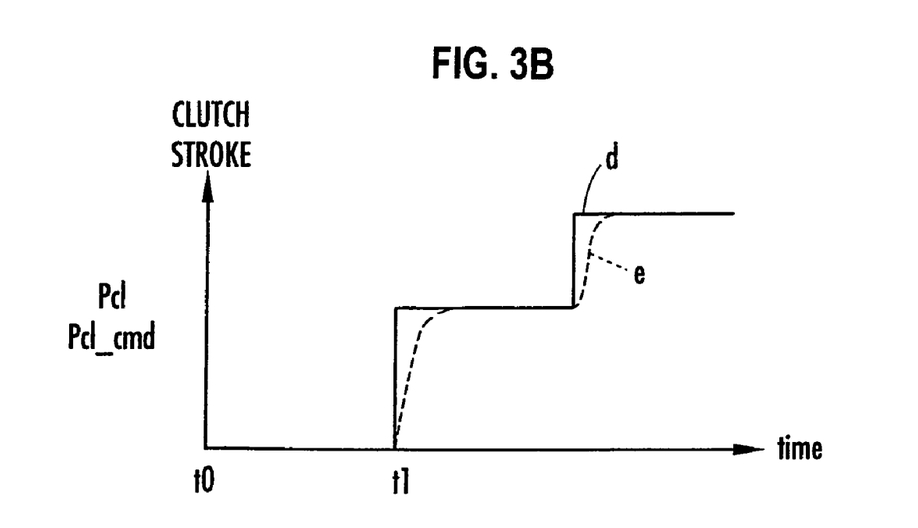

FIG. 3A and FIG. 3B are graphs showing results of simulation of the operation of the controller 10, the axis of abscissa indicating time. The axis of ordinates of the graph shown in FIG. 3A indicates the drag force of the release spring 4 and the assisting force of the compensation spring 7. In the graph, "a" denotes a predicted value of disturbance Dest, "b" denotes an actual disturbance level Fast-Fcl caused by the drag force of the release spring 4 and the assisting force of the compensation spring 7, and "c" denotes an estimated value of disturbance cl.

Referring to FIG. 3B, the axis of ordinates indicates the clutch strokes Pcl, "d" denotes the clutch stroke target values Pcl_cmd, and "e" denotes actual clutch strokes Pcl.

The predicted value of disturbance Dest and the actual disturbance level Fast-Fcl coincide with each other and the estimated value of disturbance cl remains zero from $t_0$ to $t_1$ of FIG. 3A. At $t_1$, the actual disturbance level Fast-Fcl reduces with respect to the predicted value of disturbance Dest. After $t_1$, therefore, the estimated value of disturbance cl is set in the negative direction by the adaptive disturbance observer 12 so as to compensate for a difference between the predicted value of disturbance Dest and the actual disturbance level Fast-Fcl. This restrains undue feedforward to be effected.

Setting the estimated value of disturbance cl by the adaptive disturbance observer 12 allows an actual clutch stroke Pcl to successfully follow a clutch stroke target value Pcl_cmd without causing vibrations, as illustrated in FIG. 3B, even if an actual disturbance level Fast-Fcl deviates from a predicted value of disturbance Dest.

Figure 4:
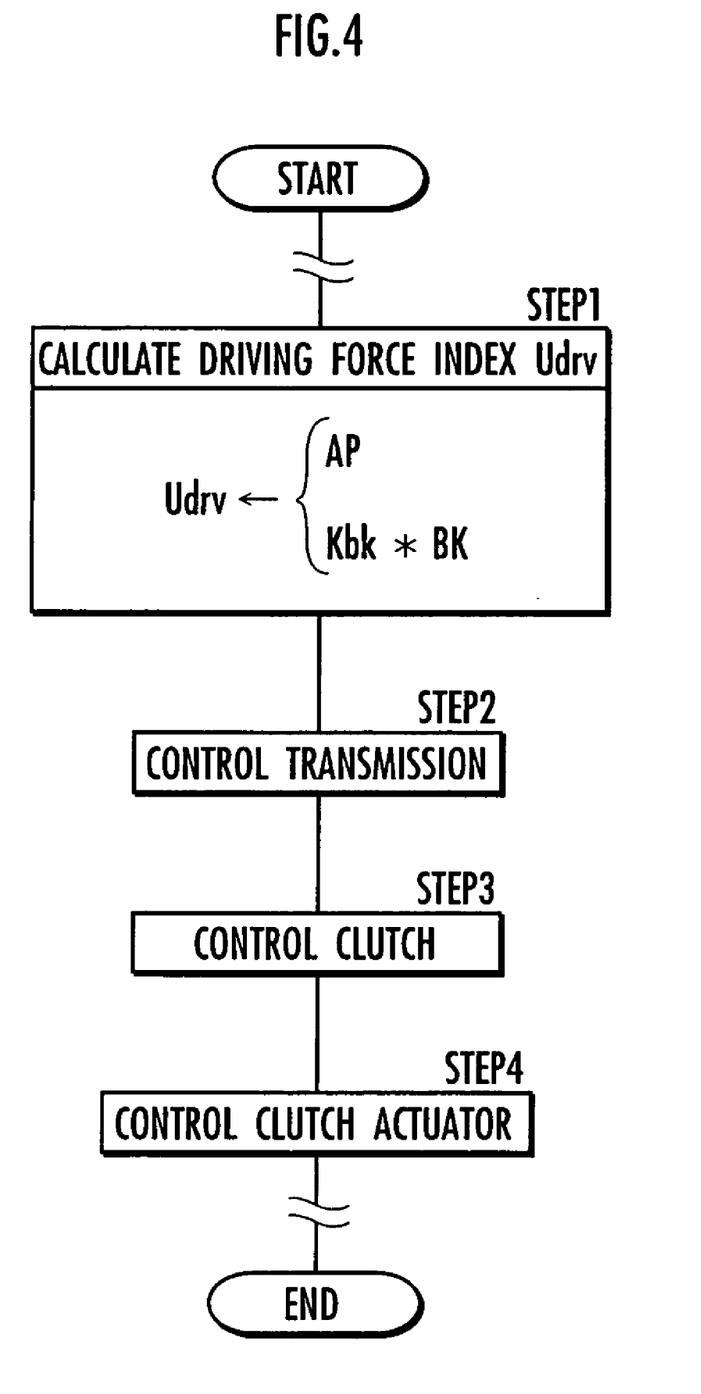
FIG. 4 is an operation flowchart of the controller shown in FIG. 2.

Referring now to FIG. 4 through FIG. 8, the operation of the controller 10 will be explained in more detail. FIG. 4 is a main operation flowchart of the controller 10. When an accelerator pedal (not shown) or a brake pedal (not shown)

is operated by a driver of a vehicle in STEP 1, the controller 10 determines a driving force index Udrv for setting a driving force to be supplied to the vehicle by the following equation (14) according to the type of operation.

[Equation 14]

$$Udrv \leftarrow \begin{cases} AP \text{ (WHEN ACCELERATOR PEDAL IS OPERATED)} \\ Kbk \times BK \text{ (WHEN BRAKE PEDAL IS OPERATED)} \end{cases} \quad (14)$$

where Udrv: Driving force index; AP: Degree of opening of accelerator pedal; BK: Brake depressing force; and Kbk: Coefficient for converting brake depressing forces (0 up to maximum) into degrees of opening of accelerator pedal (0 to −90 degrees)

Based on the determined driving force index Udrv, the controller 10 determines whether to carry out a speed changing operation on a transmission (not shown) connected to the clutch apparatus 1. If the controller 10 determines in STEP 2 to carry out the speed changing operation, then it conducts transmission control to set a transmission gear to a target position so as to implement the speed changing operation of the transmission.

In the following STEP 3, the controller 10 carries out clutch control for controlling the slide ratio of the clutch 2. In the next STEP 4, the controller 10 carries out clutch actuator control in which it calculates the voltage Vin to be applied to the motor by using the predicted value of disturbance Dest and the estimated value of disturbance cl and outputs the calculated voltage Vin to be applied to the motor to the motor 6.

Referring now to the flowcharts shown in FIGS. 5 and 6, a procedure for carrying out the transmission control by the controller 10 will be described. The controller 10 first checks in STEP 10 shown in FIG. 5 whether a request for backing up from the driver of the vehicle has been issued. If the speed changing operation has been performed, then the controller 10 proceeds to STEP 20 to set a gear selection target value NGEAR_cmd to −1 (reverse).

Figure 5:
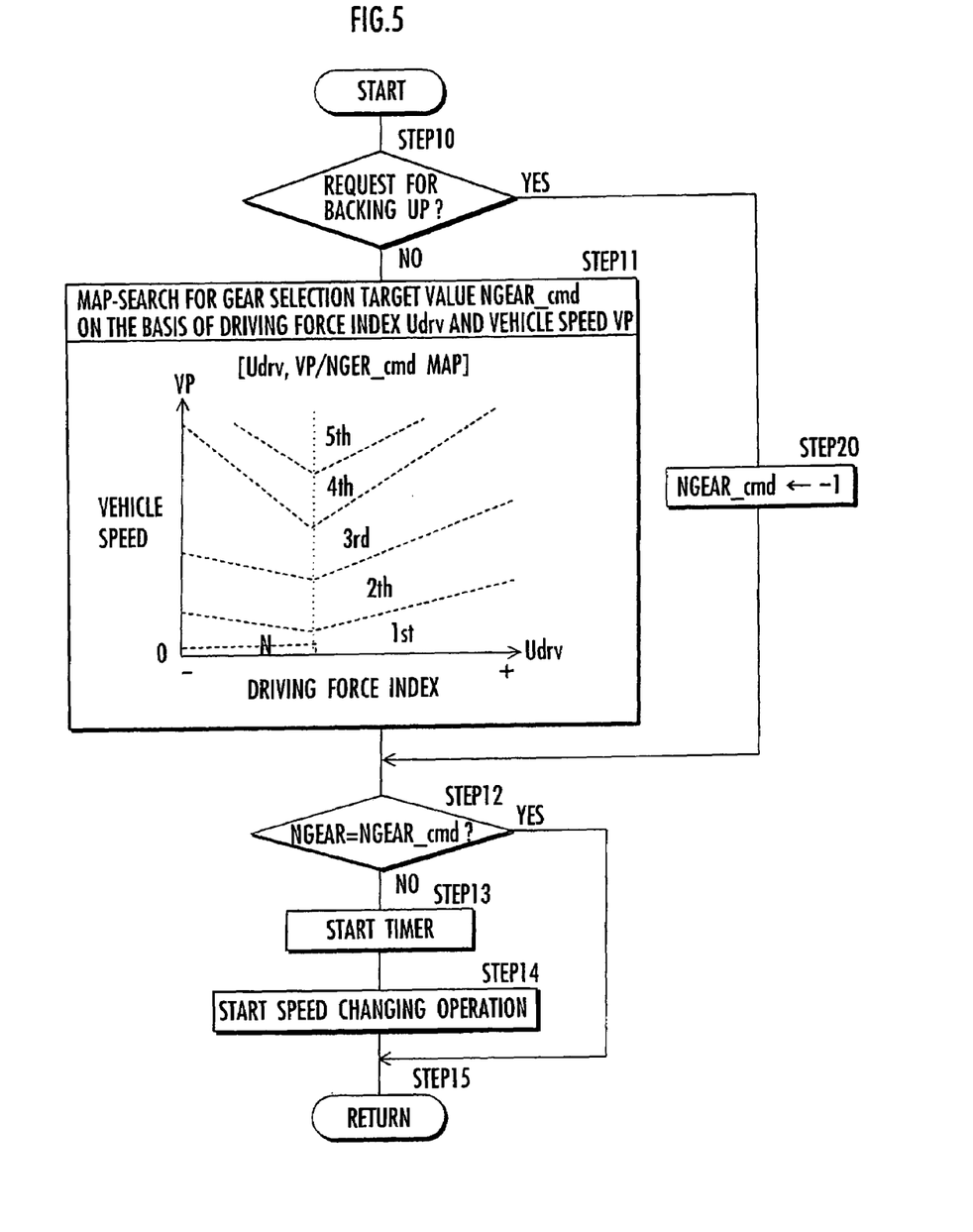
FIG. 5 is an operation flowchart of the controller shown in FIG. 2.

If the controller 10 determines in STEP 10 that no request for backing up has been issued, then it proceeds to STEP 11 wherein the controller 10 applies the driving force index Udrv and an actual vehicle speed VP of the vehicle to a Udrv, VP/NGEAR_cmd MAP shown in FIG. 5 so as to set the gear selection target value NGEAR_cmd. The relationship between the gear selection target values NGEAR_cmd and selected gear positions is as shown in Table 1 below.

with the gear selection target value NGEAR_cmd, then it proceeds to STEP 15 and does not carry out the speed changing operation of the transmission.

If the controller 10 determines in STEP 12 that the selected gear position NGEAR of the transmission does not coincide with the gear selection target value NGEAR_cmd, then the controller 10 proceeds to STEP 13 to start a timer, and begins the speed changing operation of the transmission in the next STEP 14.

The speed changing operation is implemented by three steps, namely, a clutch OFF step for setting the clutch 2 to a clutch OFF state to set a shift/select device of the transmission to a movable state, a gear position changing step for changing the selected gear position of the transmission to the gear selection target value NGEAR_cmd by the shift/select device (not shown) in the clutch OFF state, and a clutch ON step for setting the clutch 2 back to a clutch ON state after completion of the processing for changing the gear position.

To determine timings at the moment the timer starts in STEP 13 to the moment each step is completed, clutch OFF completion time TM_CLOFF, gear position change completion time TM_SCHG, and clutch ON completion time TM_CLON are set beforehand (TM_CLOFF<TM_SCHG<TM_CLON).

Figure 6:
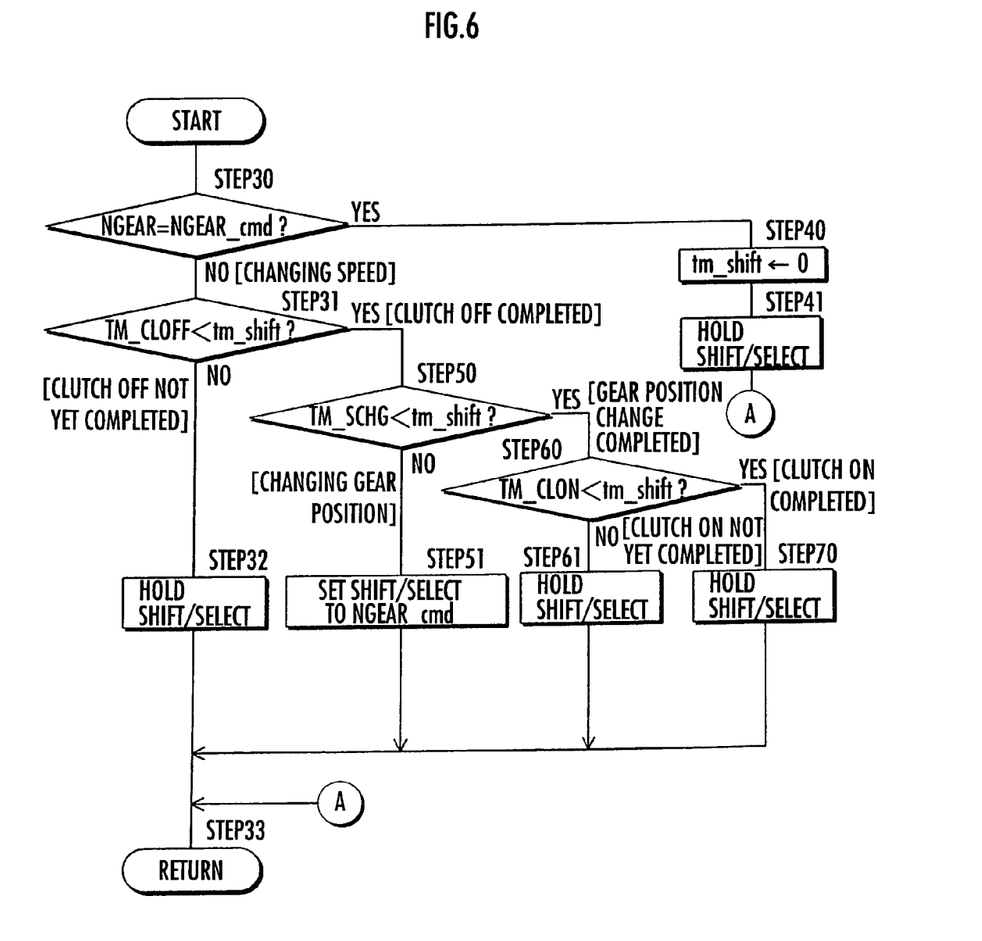
FIG. 6 is an operation flowchart of the controller shown in FIG. 2.

The flowchart shown in FIG. 6 indicates a procedure for carrying out the speed changing operation of the transmission by the controller 10 after the clutch OFF step is started. The controller 10 first determines in STEP 30 whether the actual selected gear position NGEAR of the transmission coincides with the gear selection target value NGEAR_cmd. If it is determined that the selected gear position NGEAR agrees with the gear selection target value NGEAR_cmd, that is, if the speed changing operation is completed, then the controller 10 proceeds to STEP 40 to clear a clocking count tm_shift of the timer, and maintains the shift/select device (not shown) of the transmission at the current position in the following STEP 41.

If the controller 10 determines in STEP 30 that the actual selected gear position NGEAR of the transmission does not agree with the gear selection target value NGEAR_cmd, that is, if the speed changing operation of the transmission is in the process, then the controller 10 proceeds to STEP 31.

In STEP 31, the controller 10 determines whether the clocking count tm_shift of the timer has exceeded the clutch OFF completion time TM_CLOFF. If the clocking count tm_shift of the timer has not exceeded the clutch OFF completion time TM_CLOFF, that is, if the clutch OFF step has not yet been completed, then the controller 10 proceeds to STEP 32 to maintain the shift/select device at the current position.

TABLE 1

GEAR SELECTION TARGET VALUE NGEAR_cmd AND CORRESPONDING SELECTED GEAR POSITION

| NGEAR_cmd | −1 | 1 | 2 | 3 | 4 | 5 | 0 |
|---|---|---|---|---|---|---|---|
| SELECTED GEAR POSITION | REVERSE | 1ST | 2ND | 3RD | 4TH | 5TH | NEUTRAL |

In the subsequent STEP 12, the controller 10 determines whether an actual selected gear position NGEAR of the transmission coincides with the gear selection target value NGEAR_cmd. If the controller 10 decides that the actual selected gear position NGEAR of the transmission coincides If the controller 10 determines in STEP 31 that the clocking count tm_shift of the timer has exceeded the clutch OFF completion time TM_CLOFF, that is, if the clutch OFF processing is completed, then the controller 10 proceeds to STEP 50 to determine whether the clocking count tm_shift of the timer has exceeded a gear position change completion time TM_SCHG.

If the controller 10 determines in STEP 50 that the clocking count tm_shift of the timer has not exceeded the gear position change completion time TM_SCHG, that is, if the gear position changing step is being implemented, then the controller 10 proceeds to STEP 51 to allow the shift/select device to continue the processing for changing the selected gear position of the transmission.

If the controller 10 determines in STEP 50 that the clocking count tm_shift of the timer has exceeded the gear position change completion time TM_SCHG, that is, if the gear position changing step is completed, then the controller 10 proceeds to STEP 60 to determine whether the clocking count tm_shift of the timer exceeds the clutch ON completion time TM_CLON.

If the controller 10 determines in STEP 60 that the clocking count tm_shift of the timer has not exceeded the clutch ON completion time TM_CLON, that is, if the clutch ON step is being carried out, then the controller 10 proceeds to STEP 61 to maintain the shift/select device at the current position.

If the controller 10 determines in STEP 60 that the clocking count tm_shift of the timer has exceeded the clutch ON completion time TM_CLON, that is, if the clutch ON step is completed, then the controller 10 proceeds to STEP 70 to maintain the shift/select device at the current position, and then proceeds to STEP 33.

Figure 7:
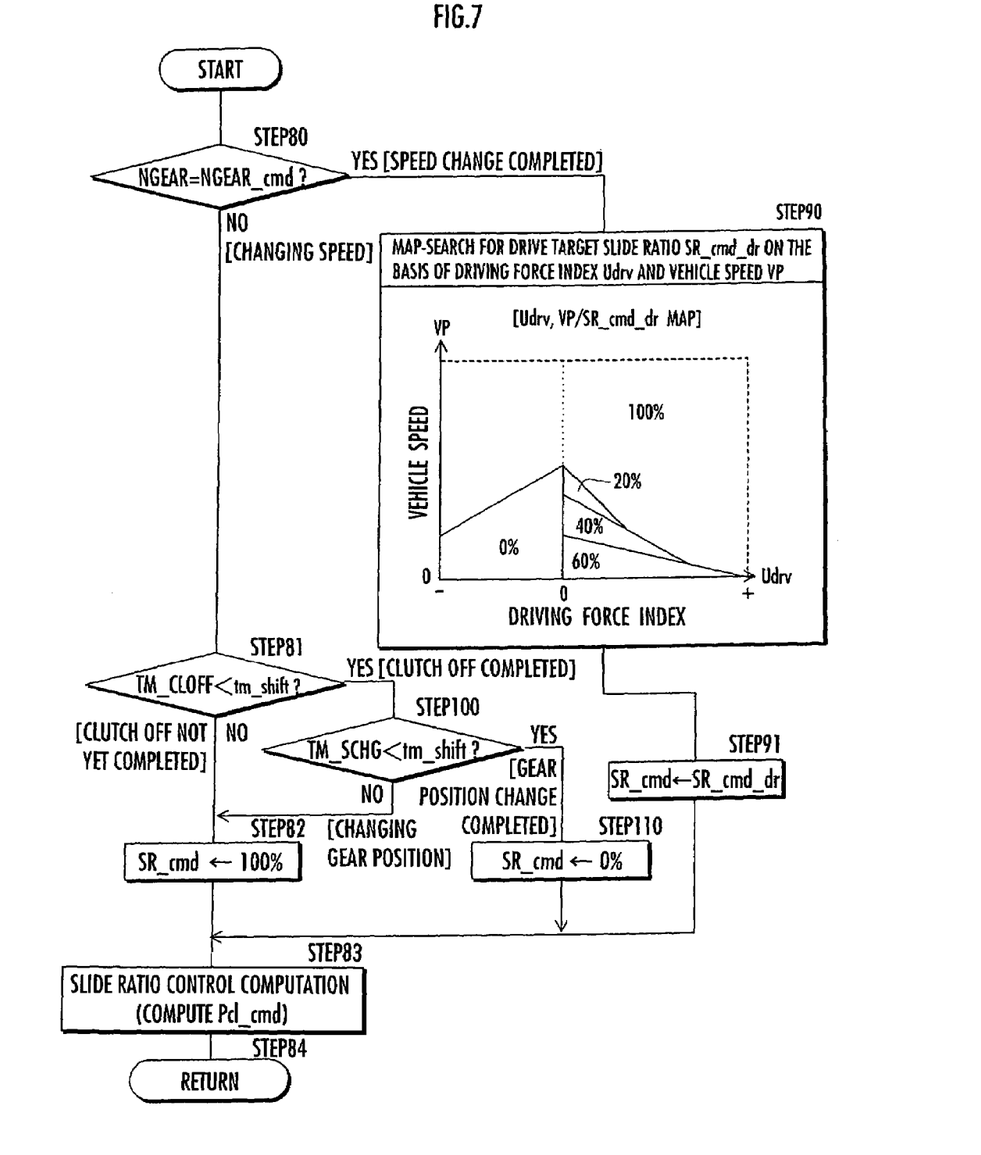
FIG. 7 is an operation flowchart of the controller shown in FIG. 2.

Referring now to the flowchart shown in FIG. 7, a procedure for carrying out the clutch control will be described. The controller 10 first checks in STEP 80 whether the actual selected gear position NGEAR of the transmission coincides with the gear selection target value NGEAR_cmd.

If the controller 10 determines in STEP 80 that the selected gear position NGEAR of the transmission coincides with the gear selection target value NGEAR_cmd, that is, if the speed changing operation is completed, then the controller 10 proceeds to STEP 90 wherein the controller 10 applies the driving force index Udrv and the actual vehicle speed VP to the Udrv, VP/SR_cmd_dr MAP shown in the flowchart so as to determine the drive target slide ratio SR_cmd_dr.

The data of the Udrv, VP/SR_cmd_dr map is stored in a memory (not shown) in advance, and the drive target slide ratio SR_cmd_dr of the clutch 2 is set in a range of 0% (clutch ON, no slide) to 100% (clutch OFF).

If the controller 10 determines in STEP 80 that the actual selected gear position NGEAR of the transmission does not coincide with the gear selection target value NGEAR_cmd, that is, if the speed changing operation is being performed, then the controller 10 proceeds to STEP 81 to determine whether the clocking count tm_shift of the timer has exceeded the clutch OFF completion time TM_CLOFF.

If the controller 10 determines that the clocking count tm_shift of the timer has not yet exceeded the clutch OFF time, that is, if the speed changing operation is still being performed, then the controller 10 proceeds to STEP 82 to set the target slide ratio SR_cmd to 100% (clutch OFF), and then proceeds to the subsequent STEP 83. In STEP 83, the controller 10 calculates a clutch stroke target value Pcl_cmd based on the target slide ratio SR_cmd.

If it is determined in STEP 81 that the clocking count tm_shift of the timer exceeds the clutch OFF completion time TM_CLOFF, that is, if the clutch OFF step has been completed, then the controller 10 proceeds to STEP 100 to determine whether the clocking count tm_shift of the timer has exceeded the gear position change completion time TM_SCHG.

If the controller 10 determines that the clocking count tm_shift of the timer has exceeded the gear position change completion time TM_SCHG, that is, if the gear position changing step has been completed, then the controller 10 proceeds to STEP 110 where it sets the target slide ratio SR_cmd to 0% (clutch ON, no slide).

If the controller 10 determines in STEP 100 that the clocking count tm_shift of the timer has not exceeded the gear position change completion time TM_SCHG, that is, the gear position changing step is still being perform, then the controller 10 proceeds to STEP 82 wherein it sets the target slide ratio SR_cmd to 100% (clutch OFF).

The controller 10 controls the slide ratio (0 to 100%) of the clutch 2 while a vehicle is traveling and the clutch slide ratio (0% or 100%) during the speed changing operation by the clutch control described above.

Referring now to the flowchart shown in FIG. 8, a procedure for carrying out the clutch actuator control will be explained. The controller 10 controls the actuation of the motor 6 so as to make the actual clutch stroke Pcl coincide with the clutch stroke target value Pcl_cmd set by the aforesaid transmission control.

Figure 8:
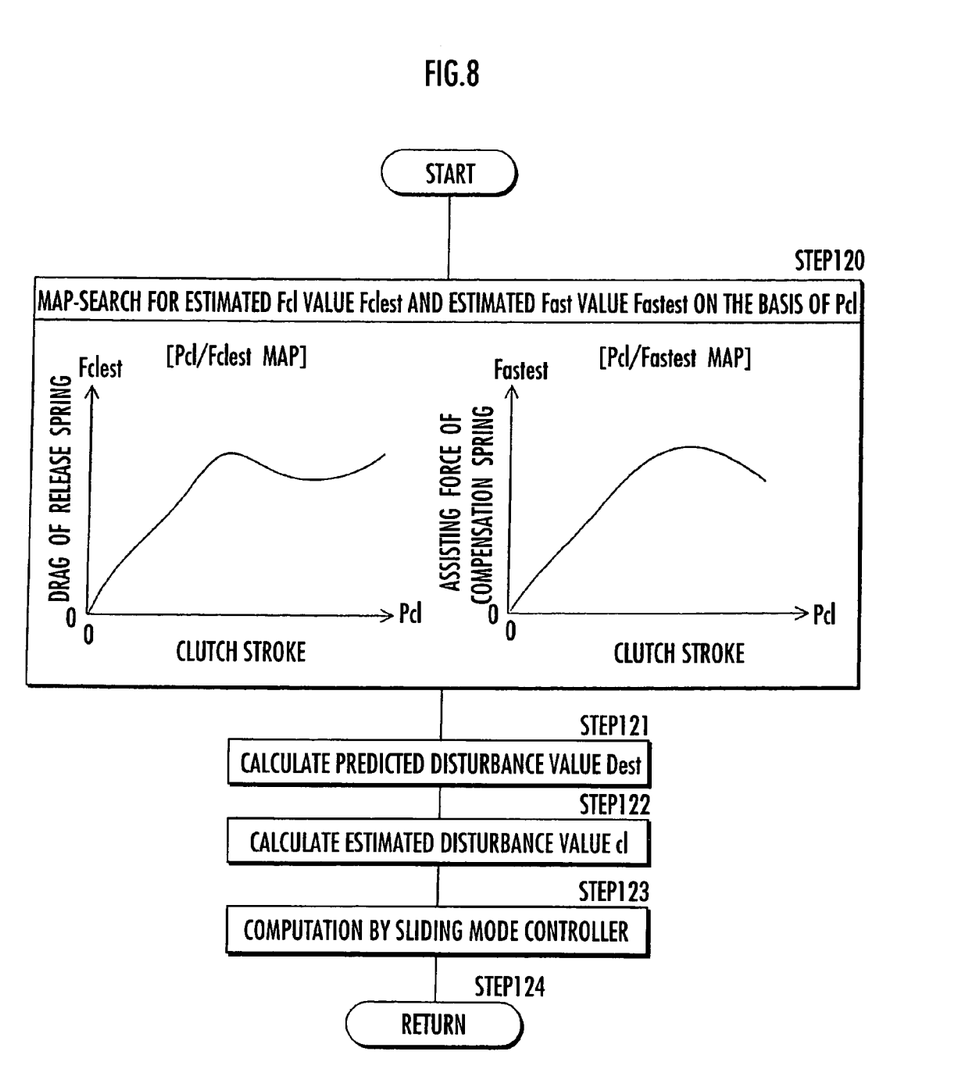
FIG. 8 is an operation flowchart of the controller shown in FIG. 2.

The disturbance predictor 11 provided in the controller 10 applies the clutch stroke Pcl to the shown Pcl/Fclest map in STEP 120 of FIG. 8 to acquire a predicted value of the drag force Fclest of the release spring 4, and applies the clutch stroke Pcl to the Pcl/Fastest map to acquire a predicted value of the assisting force Fastest of the compensation spring 7. The disturbance predictor 11 then calculates the predicted value of disturbance Dest(k) according to the above equation (7) given above in STEP 121.

In the following STEP 122, the adaptive disturbance observer 12 provided in the controller 10 calculates the estimated value of disturbance cl(k) according to the above equation (12).

In the next STEP 123, the sliding mode controller 13 provided in the controller 10 calculates the equivalent control input Ueq(k) according to the above equation (13), calculates the reaching law input Urh(k) according to the above equation (5), and calculates the voltage to be applied to the motor Vin according to the above equation (6).

In the present embodiment, the adaptive disturbance observer 12 has been provided to compensate for the difference between the predicted value of disturbance Dest calculated by the disturbance predictor 11 and an actual disturbance level. The advantages of the present invention, however, can be obtained even if the adaptive disturbance observer 12 is not provided.

In the present embodiment, the voltage Vin to be applied to the motor has been determined by the sliding mode controller 53, using the sliding mode control. Alternatively, however, other types of response specifying control, such as back-stepping control, may be used.

The present embodiment has illustrated the example in which the present invention has been applied to the clutch apparatus. The present invention, however, can be also applied to other types of plants. FIG. 9 shows an example wherein the present invention has been applied to control of the speed NE corresponding to an output value of the plant in accordance with the present invention of an engine 60, which corresponds to the plant in the present invention. For example, to change the speed of a transmission (not shown), rotational synchronization is carried out to synchronize the speed of a main shaft of the transmission and the speed NE of the engine 60. For this purpose, the speed NE of the engine 60 must be promptly converged to a target speed.

It is possible to know beforehand an approximate degree of opening of a throttle for an intake air volume required to maintain the speed NE of the engine 60 at a predetermined value. To synchronize the speeds therefore, the configuration of the controller 50 shown in FIG. 9 is applied to determine, as the predicted value of disturbance Dest, the degree of opening of the throttle corresponding to the engine speed NE by a disturbance predictor 51 according to associated data of the engine speed NE and a corresponding degree of opening of throttle TH stored in advance. The estimated value of disturbance cl is calculated by an adaptive disturbance observer 52.

The degree of opening of the throttle TH corresponding to a control input in the present invention is determined by a sliding mode controller 53 on the basis of the engine speed NE, the predicted value of disturbance Dest, and the estimated value of disturbance cl. This allows the engine speed NE to accurately follow a target speed even if the engine speed NE abruptly changes.

Furthermore, the present invention can be applied also to a cam phase changing device 70 (corresponding to the plant in the present invention) of an engine shown in FIG. 10. The cam phase changing device 70 has a disc 72 connected to a cam 71, a sprocket 73 connected to a disc 72 through the intermediary of a return spring 75, and an electromagnetic brake 74 (corresponding to the actuator in the present invention) that applies a braking force to the disc 72.

The braking force of the electromagnetic brake 74 changes with input voltages. The phase angle of the cam 71 can be controlled by changing the position, where the reaction force of the return spring 75 and the braking force of the electromagnetic brake 74 are balanced, by changing the input voltage of the electromagnetic brake 74 when the sprocket 73 rotates.

In this case, the relationship between the input voltage of the electromagnetic brake 74 and the phase of the cam 71 nonlinearly changes. To control the phase angle of the cam 71, the configuration of the controller 80 shown in FIG. 11 is applied to determine, as the predicted value of disturbance Dest, the input voltage corresponding to the phase angle (CAIN, corresponding to an output value of the plant in the present invention) of the cam 71 by a disturbance predictor 81 according to associated data of the cam phase CAIN and corresponding input voltage Vvtc stored in advance. The estimated value of disturbance cl is calculated by an adaptive disturbance observer 82.

The input voltage of the electromagnetic brake 74 (Vvtc, corresponding to a control input in the present invention) is calculated by a sliding mode controller 83 on the basis of the phase angle CAIN, the predicted value of disturbance Dest, and the estimated value of disturbance cl. This allows the phase angle CAIN to accurately follow a target angle even if the phase angle CAIN abruptly changes.

What is claimed is:

1. A plant control system having a controlling means for determining a control input to a plant wherein an output value of the plant coincides with a target output value under a response specifying control that allows a convergent behavior for a difference between a plant output value and a target output value to be variably designated, comprising:

storage means storing in advance data of a correlation map representing a correlation between output values of the plant and levels of disturbance acting upon the plant, and disturbance predicting means for determining a level of disturbance acting on the plant as a predicted value of disturbance obtained by applying an output value of the plant to the correlation map, wherein the controlling means determines a control input to the plant on the basis of a linear function and the predicted value of disturbance that define a convergent behavior for the difference.

2. The plant control system according to claim 1, wherein the controlling means determines a control input to the plant according to a model equation for calculating an output of the plant in a next control cycle by inputting an output of the plant in a control cycle before the present cycle and a control input to the plant and disturbance for each predetermined control cycle, using a value of a control input in the model equation obtained when the linear function is set to zero.

3. The plant control system according to claim 1, comprising:

disturbance estimating means for determining an estimated value of disturbance that changes according to an error of the predicted value of disturbance relative to a level of actual disturbance acting upon the plant on the basis of the predicted value of disturbance, an output value of the plant, and a control input to the plant, wherein the controlling means determines a control input to the control plant by using the estimated value of disturbance.

4. The plant control system according to any one of claims 1 and 2–3, wherein the plant comprises a clutching mechanism for switching between transmission and cutoff of motive power from a driving shaft to a driven shaft, and has an actuator for actuating at least one of a clutch disc for the driving shaft and a clutch disc for the driven shaft that are in frictional engagement, and an elastic member generating a drag force or an assisting force applied to the actuator according to an operation of the actuator, wherein the target output denotes a distance between the clutch disc for the driving shaft and the clutch disc for the driven shaft, the control input comprises a manipulated variable for the actuator, and the disturbance predicting means determines, as the predicted value of disturbance, an output level of the elastic member that changes according to a distance between the clutch disc for the driving shaft and the clutch disc for the driven shaft.

5. The plant control system according to any one of claims 1 and 2–3, wherein the plant comprises an engine, the target output comprises an engine speed, the control input comprises a manipulated variable for a throttle for adjusting an amount of fuel supplied to the engine, and the disturbance predicting means determines, as the predicted value of disturbance, a degree of an opening of the throttle that changes according to the engine speed.

6. The plant control system according to any one of claims 1 and 2–3, wherein the plant comprises an engine cam phase changing mechanism, the target output comprises a cam phase angle of the cam phase changing mechanism, the control input comprises a manipulated variable for an actuator operating a cam of the cam phase changing mechanism, and the disturbance predicting means determines, as the predicted value of disturbance, a manipulated variable for the actuator that changes according to the cam phase angle.

* * * * *